Figure 1:
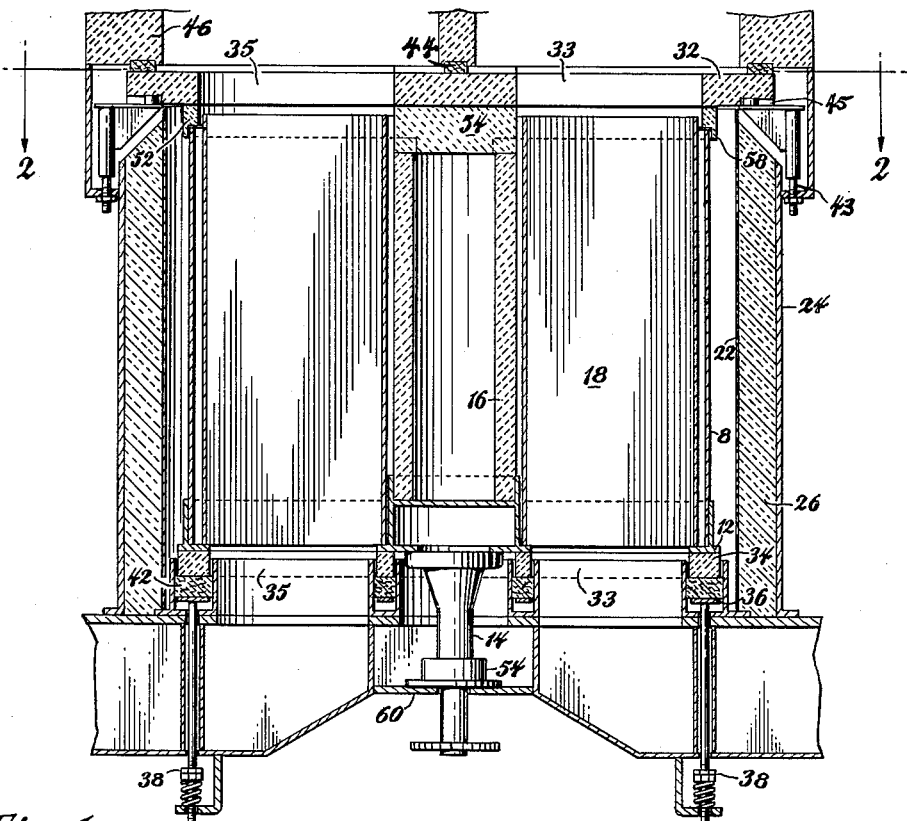

Oct. 29, 1963   A. JENSEN ETAL   3,108,632
ROTOR ARRANGEMENT FOR ROTARY REGENERATIVE HEAT EXCHANGER
Filed April 20, 1960

INVENTORS
Arthur Jensen
John Egbert
By Wayne Lang
AGENT

United States Patent Office 3,108,632
Patented Oct. 29, 1963

3,108,632
ROTOR ARRANGEMENT FOR ROTARY
REGENERATIVE HEAT EXCHANGER
Arthur Jensen and John Egbert, Wellsville, N.Y., assignors, by mesne assignments, to Combustion Engineering, Inc., a stock corporation of Delaware
Filed Apr. 20, 1960, Ser. No. 23,498
2 Claims. (Cl. 165—9)

The present invention relates to heat exchange apparatus generally, and more particularly it relates to a rotary regenerative heat exchanger that is adapted for use in zones of very high temperature.

In rotary regenerative heat exchange apparatus a mass of heat exchange material carried in a rotor is first positioned in a passage for a heating fluid to absorb heat from the fluid flowing therethrough, and upon turning the rotor about its axis, the heat exchange material is positioned in a spaced fluid passage where it is free to transfer its absorbent heat to a fluid to be heated passing therethrough. The rotor is surrounded by a housing having end or sector plates formed with openings therein to provide for the passage of the fluids, and to prevent their mingling, sealing means are provided at the ends of the rotor to wipe against or pass in closely spaced relation with the imperforate portion of the adjacent housing structure.

Since the heating fluid and the fluid to be heated are preferably directed through the heat exchanger in a counterflow arrangement the inlet for the heating fluid and the outlet for the fluid heated lie at adjacent ends of the heat exchanger while the outlet for the heating fluid and the inlet for the fluid to be heated lie at the same end of the rotor. Thus the rotor is divided into two basic temperature zones, the one which lies adjacent the inlet for the heating fluid commonly being termed the "hot end" while that adjacent the inlet for the fluid to be heated is termed the "cold end" of the rotor, and reference hereafter may be made to the "hot" and "cold" ends of the rotor without further explanation.

Rotary regenerative heat exchange apparatus is generally considered to provide a most efficient method of heat transfer, and the use of such apparatus is quite common at temperatures that lie within the working range of the steel or its alloys that comprise the heat exchanger structure. However, for temperatures well above these limits as are frequently found in certain processes common in steelmaking, aluminum refining or the chemical industries, the usual metallic rotary regenerative heat exchange apparatus is completely inadequate.

Various successful attempts have been made to utilize ceramic materials as the heat absorbent element at the hot end of the rotor, but the development of a rotary regenerative heat exchanger having ceramic housing and structure components in all high temperature areas has not been possible because of the inherent physical deficiencies of ceramic materials.

Thus ceramic structural components crack and spall to an alarming degree when subjected to the stresses that accompany a thermal gradient or a thermal shock. Heretofore, no manner of arrangement has been proposed that would permit the use of ceramic materials in structural as well as in a heat absorbent capacity.

Therefore, the chief object of the present invention is to provide a novel arrangement by which a rotary regenerative heat exchanger including major housing and structural components may be formed from temperature resistant ceramic materials.

Figure 2:
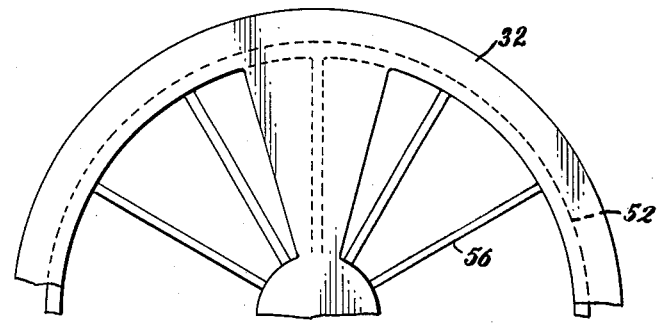

The manner in which this object is carried out will be more readily understood when viewed in conjunction with the accompanying drawings in which:

FIGURE 1 is a sectional elevation showing the rotary regenerative heat exchanger according to the invention and, FIGURE 2 is a horizontal section as seen from line 2—2 of FIGURE 1.

In the drawing the numeral 8 represents a cylindrical shell of a rotor of heat resistant ceramic material that rests upon the annular periphery of a metallic spider 12. The spider 12 is in turn carried by the trunnion 14 that is rotated about its vertical axis by a prime mover not illustrated. A ceramic rotor post 16 is supported upon the hub of the spider concentrically within the rotor shell 8 to provide an annular space therebetween in which is carried a mass of ceramic heat transfer element 18.

The rotor is surrounded by a housing that comprises a ceramic liner 22 within a steel casing 24, the annular space therebetween being packed with an insulation material 26 of ceramic fiber. The rotor housing is provided at opposite ends thereof with ceramic end or sector plates 32 and 34 having apertures 33 and 35 for the flow of the heating fluid and the fluid to be heated to and through the heat transfer element 18.

The lower end plate 34 at the "cold end" of the rotor is supported upon a metallic compacting ring 36 that is carried upon a series of axially adjustable plungers 38 spaced about its arcuate periphery. A packing 42 of ceramic fiber intermediate the end plate 34 and the metallic compacting ring provides a resilient cushion that equalizes plunger pressure and materially reduces the possibility of damage to the ceramic end plate 34 from mechanical and thermal shock.

The upper end plate 32 comprises a ceramic casting that is adjustably supported by a series of supports 43 located about the arcuate periphery of the housing. Grooves 45 in end plate 32 provide a loose fit with projections on the end of supports 43. A fibrous ceramic packing 44 intermediate the upper surface of end plate 32 and the confronting surface of connecting plate 46 permits limited tilting of the vertical axis of plate 32 by variously adjusting supports 43.

A ceramic sealing plate intermediate the upper end of the rotor and end plate 32 includes an annular rim 52 supported by radial spokes 56 that extend outward from a central hub 54. The sealing plate is pivotally supported upon the upper end of the rotor post 16 and is keyed thereto to insure its rotation with the rotor while it is free to tilt about its vertical axis to conform to the confronting plane surface of adjacent plate 32. An annular flange 58 extends axially from rim 52 to slidably embrace the periphery of shell 8 so as to permit angular displacement of the end of the rotor shell 8 within the flange 58 without altering the sealing relationship between the adjacent surfaces of end plate 32 and rim 52.

A jacking mechanism 54 supported on housing structure 60 is provided in a readily accessible location to move the entire rotor axially within its surrounding housing to a predetermined spacing relationship with the end plate 32. When the rim 52 of the sealing ring is brought close to the end plate 32, the plane of the end plate 32 may be adjusted to lie parallel to the sealing ring by means 43.

This invention therefore provides an arrangement that permits substantial manual adjustment in addition to limited automatic adjustment of the sealing surfaces to provide an optimum sealing relationship throughout a wide range of thermal expansion. Thus the ceramic sealing elements need not be subjected to a stress concentration that would tend to break or crack the several sealing elements before they reach operating temperature and can be placed in actual service, and the relationship of sealing surfaces may be readily varied at any time during operation of the device.

While our invention has been described with reference to the embodiment illustrated in the drawing, it is evident that various changes may be made without departing from the spirit of the invention and it is intended that all matter contained in the above description or shown in the accompanying drawing shall be interpreted as illustrative and not in a limiting sense.

What we claim is:

1. Heat exchanger apparatus having a rotor comprising a rotor shell concentrically disposed about a central rotor post to provide an annular space therebetween that carries a mass of heat transfer material alternately between a heating fluid and a fluid to be heated, a cylindrical housing surrounding the rotor shell including upper and lower annular end plates at opposite ends thereof apertured to direct the flow of heating fluid and fluid to be heated through the heat transfer material carried by the rotor, means carried by the cylindrical housing adapted to adjustably move the upper and lower end plates into planes parallel to and closely adjacent the end edges of the rotor, and an annular sealing plate cextensive with an end of the rotor and rotatable therewith, a pivotal connection between the sealing plate and rotor adapted to permit the sealing plate to pivot freely about an axis normal to the rotor post to conform readily to variations in the clearance space between the end of the rotor and its adjacent end plate to provide an optimum sealing relationship therebetween.

2. Heat exchange apparatus having a metallic support spider including a central hub and an annular rim joined by ribs that extend radially therebetween, a ceramic rotor post supported by said central hub, a cylindrical rotor shell supported on said annular rim to provide an annular space between the rotor post and rotor shell, a mass of heat absorbent material carried in said annular space, inlet and outlet ducts for a heating fluid and a fluid to be heated, means for moving the rotor alternately between the ducts for the heating fluid and the fluid to be heated, a cylindrical housing surrounding the rotor shell, ceramic end plates at opposite ends of the rotor housing including spaced apertures that direct the heating fluid and the fluid to be heated through the heat absorbent material carried by the rotor, adjustment means carried at opposite ends of the housing supporting the rim of each end plate and arranged to move it into sealing relationship with the adjacent end of the rotor, and an apertured sealing plate intermediate the rotor and the end plate at the end of the rotor remote from said spider having means connecting it to the end of the rotor post, said connecting means having a pivotal linkage that permits the sealing plate to incline its axis to conform to the position of the adjacent end plate.

References Cited in the file of this patent

UNITED STATES PATENTS

| | | |
|---|---|---|
| 2,708,106 | Grames | May 10, 1955 |
| 2,789,793 | Theoclitus | Apr. 23, 1957 |
| 2,873,952 | Muderschbach et al. | Feb. 17, 1959 |
| 2,981,521 | Evans et al. | Apr. 25, 1961 |
| 3,010,704 | Egbert | Nov. 28, 1961 |

FOREIGN PATENTS

| | | |
|---|---|---|
| 1,201,387 | France | Aug. 23, 1957 |